(12) United States Patent
Smith

(10) Patent No.: US 6,242,700 B1
(45) Date of Patent: Jun. 5, 2001

(54) END SEAL ASSEMBLY FOR A SPLICE CASE

(75) Inventor: Russell P. Smith, Georgetown, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/457,837

(22) Filed: Dec. 9, 1999

Related U.S. Application Data

(60) Provisional application No. 60/117,376, filed on Jan. 27, 1999.

(51) Int. Cl.$^7$ ................................................ H02G 15/02
(52) U.S. Cl. .................................................. 174/77 R
(58) Field of Search ................... 174/77 R, 92, 174/93, 74 A, 74 R

(56) References Cited

U.S. PATENT DOCUMENTS

| | | | |
|---|---|---|---|
| 2,792,441 | 5/1957 | Platow | 174/23 |
| 2,967,795 | 1/1961 | Bollmeier et al. | 165/2.22 |
| 3,209,069 | 9/1965 | Ruddell et al. | 174/138 |
| 3,215,761 | 11/1965 | Gelpey | 264/139 |
| 3,254,153 | 5/1966 | Kohler | 174/93 |
| 3,260,794 | 7/1966 | Kohler | 174/138 |
| 3,290,194 | 12/1966 | Gillemot | 156/48 |
| 3,339,011 | 8/1967 | Ewers, Jr. et al. | 174/92 |
| 3,427,393 | 2/1969 | Masterson | 174/23 |
| 3,725,581 | 4/1973 | Gillemot et al. | 174/38 |
| 3,836,694 | 9/1974 | Kapell | 174/22 |
| 3,836,702 | 9/1974 | Plummer | 174/92 |

(List continued on next page.)

FOREIGN PATENT DOCUMENTS

| | | |
|---|---|---|
| 1 536 683 | 12/1978 | (GB) . |
| WO 95/15600 | 6/1995 | (WO) . |
| WO 98/21795 | 5/1998 | (WO) . |
| WO 98/32207 | 7/1998 | (WO) . |

OTHER PUBLICATIONS

Journal of American Chemical Society, vol. 49, p. 3181 (1927).
Search Report for PCT/US00/02088 Jun. 20, 2000.

*Primary Examiner*—Dean A. Reichard
*Assistant Examiner*—Chau N. Nguyen
(74) *Attorney, Agent, or Firm*—John A. Fortkort

(57) ABSTRACT

An end seal assembly is adapted to seal the space between at least one cable and a closure to restrict fluid transfer through the seal. The end seal assembly includes an end seal having a body formed from an elastic, flexible material. The body includes a core portion and an extended tail portion. The core portion has an outer peripheral surface, spaced ends, and a wall forming at least one cylindrical opening through the core portion. The cylindrical opening extends between the spaced ends. The wall has two edges communicating with the outer peripheral surface of the core portion to define between the two edges an entrance slot to the at least one of the cylindrical openings. The extended tail portion is integral with and extends from the outer peripheral surface of the core portion. Moreover, the tail portion has a surface tangential to the wall forming the at least one opening. In addition, the tail portion has sufficient length to wrap about the outer peripheral surface of the core portion to form a wrapped end seal such that the tail portion covers the entrance slot of the at least one opening and a cable to be placed therein. The assembly further includes a rigid collar having first and second collar portions that are pivotably interconnected. The first and second portions have inner surfaces that conform to and enclose the wrapped end seal to form an inner cavity between the wrapped end seal and the first and second portions of the collar. The collar also has an outer surface adapted to sealingly abut an end of the closure. Furthermore, the assembly provides for injection of a sealant composition to fill the inner cavity and to bond together the wrapped end seal, the cable (which is placed in the opening), and the rigid collar.

42 Claims, 5 Drawing Sheets

U.S. PATENT DOCUMENTS

| | | | |
|---|---|---|---|
| 3,895,180 | 7/1975 | Plummer | 174/92 |
| 3,903,595 | 9/1975 | Takada et al. | 29/628 |
| 3,935,373 | 1/1976 | Smith et al. | 174/77 R |
| 3,992,569 | 11/1976 | Hankins et al. | 174/92 |
| 4,015,072 | 3/1977 | Gillemot | 174/92 |
| 4,262,167 | 4/1981 | Bossard et al. | 174/92 |
| 4,287,386 | 9/1981 | Scahill et al. | 174/76 |
| 4,298,415 | 11/1981 | Nolf | 156/85 |
| 4,332,975 | 6/1982 | Dienes | 174/76 |
| 4,363,842 | 12/1982 | Nelson | 428/36 |
| 4,389,440 | 6/1983 | Keith | 428/36 |
| 4,400,579 | 8/1983 | Nolf | 174/854 R |
| 4,444,996 | 4/1984 | Robertson | 174/74 A |
| 4,560,828 | 12/1985 | Franckx et al. | 174/71 R |
| 4,607,469 | 8/1986 | Harrison | 52/220 |
| 4,640,978 | 2/1987 | Kilbane et al. | 174/23 R |
| 4,670,069 | 6/1987 | Debbaut et al. | 156/48 |
| 4,740,653 | 4/1988 | Hellbusch | 174/21 R |
| 4,790,544 | 12/1988 | Kemp | 277/34 |
| 4,822,434 | 4/1989 | Sawaki et al. | 156/48 |
| 4,933,512 | 6/1990 | Nimiya et al. | 174/92 |
| 5,116,558 | 5/1992 | Wrobel et al. | 264/46.6 |
| 5,124,507 | 6/1992 | Dehling | 174/92 |
| 5,194,192 | 3/1993 | Seebode | 264/35 |
| 5,258,578 | 11/1993 | Smith et al. | 174/93 |
| 5,302,779 | 4/1994 | Morel et al. | 174/92 |
| 5,396,033 | 3/1995 | Piriz et al. | 174/94 R |
| 5,399,811 | 3/1995 | Fremgen et al. | 174/93 |
| 5,539,070 | 7/1996 | Zharov et al. | 526/198 |
| 5,825,961 | 10/1998 | Wilkins et al. | 385/135 |

END SEAL ASSEMBLY FOR A SPLICE CASE

This application is a regular application claiming priority from U.S. provisional application Ser. No. 60/117,376, filed Jan. 27, 1999.

FIELD OF THE INVENTION

The present invention relates generally to a conformable seal assembly for cables entering a splice case, and in particular to an end seal assembly that is easily installed and removed while restricting migration of fluids into and out of the splice case.

BACKGROUND OF THE INVENTION

Frequently in the telecommunications industry, it is desirable to splice together two or more cables, either to extend a cable or to tap into another cable. The formation of a splice involves removal of the outerjacket and other layers of the cable to expose the individual conductors or optical fibers which are then individually connected to the conductors or fibers of another cable or cables. After the splice is formed, it must be protected from water and other vapors to prevent corrosion or a short circuit. For this purpose, the splice area is often enclosed in a splice case that is formed from two trough-like half shells with separate end plates or seals. Different end seals are used to accommodate different diameter cables and splice cases of different dimensions.

An example of such an end seal is disclosed in U.S. Pat. No. 5,258,578 (Smith et al.). This end seal is adapted to seal the space between the cables and the splice case to restrict fluid transfer through the seal. The seal is formed from a body of an elastic, flexible material such as a gel having self-adhesive properties. The body comprises a core portion and a tail portion. The core portion has a shape corresponding to the ends of the splice case and includes cylindrical openings through which the cables extend. The opening are exposed at the outer peripheral surface of the core. The body of the seal also includes a tail portion that is integral with, and extends from, the sur face of the core portion. The tail portion has a length sufficient to wrap about the outer peripheral surface of the core to cover all the cylindrical openings. The openings are generally smaller than the diameter of the cables to be placed therein so that the elastic core must expand for the openings to accommodate the cables. When wrapped around the core, the tail seals the portion of the cable between the core and the inside surface of the ends of the splice case.

As a result of its elastic properties, the previously described end seal is capable of sealing a variety of different diameter cables. The diameter of the end seal is determined by the number of cables extending through the core, the diameter of the cables, and the length of the tail portion. As a consequence, the diameter of the end seal is easily changed. This feature allows the end seal to be used in splice cases of differing diameter.

One limitation of this end seal is that, whenever it is removed from a splice case, the seals formed between the core and the cables extending through the openings in the core are disturbed, and therefore the cables must be repositioned upon re-installation of the end seal. Moreover, while the diameter of the end seal can be varied, this feature is unnecessarily cumbersome in those situations where splice cases of a standard size are to be used. In particular, because the end seal is not standardized for any given splice case, additional hardware, such as gaskets or washers, are sometimes required to properly insert the end seal in the closure. In some cases, it is even necessary to trim the end seal so that it will fit in the closure.

There is thus a need in the art for an end seal assembly in which the cables remain fixed in the core even when the assembly is removed from the closure, and which can be made compatible with many different cables and closures with a minimum of effort.

A further problem encountered with some existing end seal assemblies, particularly those which are wrappable (e.g., end seals of the core-and-tail variety) or which have a layered configuration, has to do with telescoping. With a core-and-tail type end seal, for example, the tail portion is often wrapped somewhat loosely around the inserted cable at the time it is placed into the assembly. As a result, a sealant or adhesive which is injected into the end seal has a tendency to ooze through any gaps between overlapping sections of the end seal. Moreover, if a longitudinal force is applied to the inserted cable before the sealant or adhesive has hardened sufficiently, the end seal will tend to telescope inwardly or outwardly from the closure, thereby undermining the integrity and mechanical strength of the seal. There is thus a need in the art for a wrappable end seal which resists telescoping and which minimizes loss of sealant or adhesive through gaps in the end seal.

These and other needs are met by the present invention, as hereinafter described.

SUMMARY OF THE INVENTION

The present invention provides an end seal assembly for use in sealing the area at the end of a splice closure or terminal through which cables are positioned, thereby restricting moisture from entering the closure. The end seal assembly preferably includes an end seal of the core-and-tail type, wherein the end seal has an integral core with a wrappable tail portion extending tangentially therefrom. In some embodiments, the end seal is enclosed in a rigid collar that has an outer surface which provides a standard configuration that fits into a correspondingly configured splice case, regardless of the precise dimensions of the end seal itself. Accordingly, the end seal assembly does not require trimming or additional hardware when it is placed in the closure. A cavity formed between the end seal and the collar may be filled with an expanding sealant material or other suitable sealant or adhesive so as to provide an airtight seal and to bond into an integral unit the wrapped end seal, a cable inserted through the core of the end seal, and the rigid collar.

In accordance with one aspect of the invention, an end seal assembly is adapted to seal the space between at least one cable and a closure to restrict fluid transfer through the seal. The end seal assembly includes an end seal having a body formed from an elastic, flexible material. The body includes a core portion which typically has an outer peripheral surface, spaced ends, and a wall forming at least one cylindrical opening through the core portion, which cylindrical opening extends between the spaced ends. The wall has two edges communicating with the outer peripheral surface of the core portion to define between the two edges an entrance slot to the cylindrical opening. An extended tail portion is integrally formed, with and extends from, the surface of the core portion. The tail portion, which has a surface tangential to the wall forming the cylindrical opening, has a sufficient length to wrap about the peripheral surface of the core portion to form a wrapped end seal such that the tail portion covers the entrance slot of the opening and a cable to be placed therein.

The end seal assembly further comprises a rigid collar having first and second collar portions that are pivotably interconnected. The first and second portions have inner surfaces that conform to, and enclose, the wrapped end seal to form an inner cavity between the wrapped end seal and the first and second portions of the collar. The collar also has an outer surface adapted to sealingly abut an end of the closure. A sealant composition fills the inner cavity to bond together the wrapped end seal, the cable to be placed in the cylindrical opening, and the rigid collar.

In another aspect, the present invention provides a cable splice closure end seal assembly in which the end seal has a core portion with a tail portion extending tangentially therefrom. The tail portion is provided with a mesh on the surface thereof which is adapted to bond tightly to a sealing composition or adhesive, and which is particularly useful with an expandable foam sealing composition. In a related embodiment, the tail portion comprises two substantially parallel rails which are connected to each other by a plurality of transverse members to form a ladder-like configuration. The tail portion in either of these embodiments may be constructed with a tongue-and-groove configuration so that the overlapping portions of the tail (when the tail is wrapped around the core) mate with each other. The construction of these end seals allows a sealant or adhesive injected into the end seal to bond the overlapping portions together, thereby forming a strongly bonded integral unit which resists telescoping. The tongue and groove feature that may be incorporated into these embodiments aids in the proper alignment of the tail portion and also provides additional insurance against telescoping by providing a preliminary seal while the sealant or adhesive is hardening.

In yet another aspect, the present invention provides a sealing plug which can be used with a core-and-tail type end seal assembly to provide future cable access into the assembly without disturbing existing cable seals. The plug comprises a hollow shaft which terminates on one end in a removable seal. In use, the plug is placed in one of the apertures within the end seal (with the sealed end extending from the end seal) at the time that the end seal assembly is put together. When additional cable access is required, the terminal portion of the plug is removed, the cable is inserted through the shaft and positioned as desired in the end seal assembly, and the shaft is filled with a sealant. The plug may be provided with one or more apertures to facilitate the introduction of a sealing material into the shaft and/or to permit the removal of excess sealing material from the shaft, and may also be provided with a scored lip, frangible neck, or other means which facilitate removal of the terminal portion.

BRIEF DESCRIPTION OF THE DRAWINGS

The present invention will be further described hereinafter with reference to the accompanying drawings, wherein.

DETAILED DESCRIPTION

The end seal assemblies of the present invention are adapted for use in sealing the end of a closure such as an aerial splice case, a buried splice case or a pedestal splice case so as to restrict fluid from entering or escaping the closure.

Figure 1:
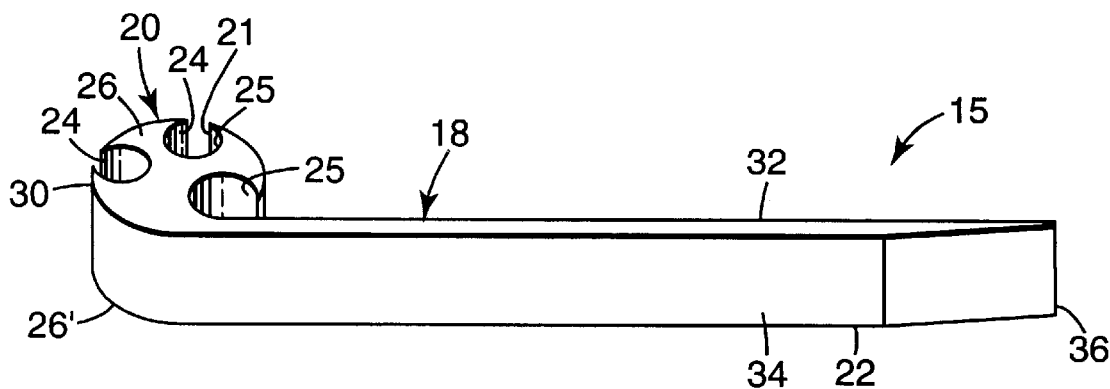
FIG. 1 is a perspective end view of a first exemplary end seal that may be employed in the present invention.

The preferred end seal for use in the end seal assemblies of the present invention is a conformable end seal having a core-and-tail construction. One such end seal 15 is shown in FIG. 1. This particular end seal is described in detail in U.S. Pat. No. 5,258,578 (Smith et al.), which is incorporated herein by reference. The end seal is formed of a material which can be cast or molded into a solid body, or which can be extruded and cut into separate end seals. The end seal comprises a core portion 20 and a tail portion 22. The core portion is of generally cylindrical shape with opposing end faces 26, 26', of which only face 26 is shown in FIG. 1. The core portion has a plurality of cylindrical openings 24 defined by curved walls 25, which extend between the end faces 26, 26'. The semicircular walls begin and end at the outer peripheral surface 30 of the core portion so that the cylindrical openings are not completely circumferentially surrounded by the curved walls. That is, the cylindrical openings each have an entrance slot 21 to permit an endless cable or wire to be inserted into the opening.

The tail portion of the end seal extends from the core, preferably in the vicinity of one of the cylindrical openings. In particular, the inner surface 32 of the tail portion preferably extends from one of the cylindrical openings in a direction generally tangential to the curved wall which defines the cylindrical opening. The tail portion has an essentially uniform thickness and cross section along its length except for the portion near its free end 36, where the thickness of the tail portion begins to diminish or taper to a free edge so as to form a smooth transition to that section of the outer surface 34 of the tail portion which is wrapped about the peripheral surface of the core portion and the exposed portion, if any, of a wire or cable disposed in each of the cylindrical openings.

Figure 3:
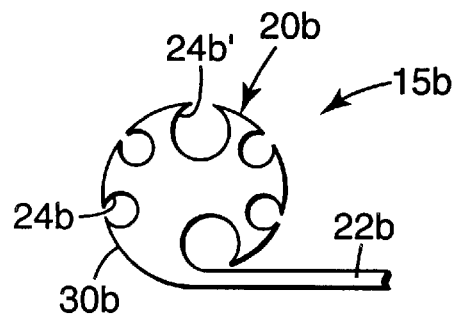
FIG. 3 is a side view of a third end seal that may be employed in the present invention.
Figure 4:
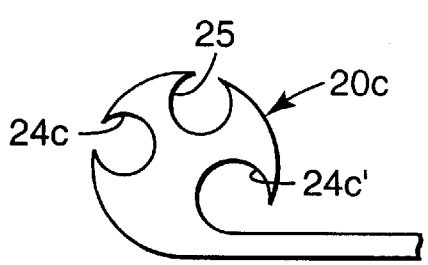
FIG. 4 is a side view of a fourth end seal that may be employed in the present invention.

The end seals useful in the end seal assemblies of the present invention may be equipped with a variety of openings which are adapted to receive wires, cables, or plugs of various sizes and shapes. Some of the possibilities are illustrated in FIGS. 2–4.

Figure 2:
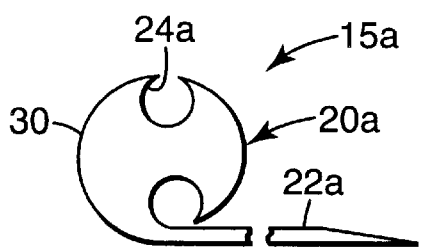
FIG. 2 is an end view of an example of a second end seal, with the tail portion partially broken away for illustration, that may be employed in the present invention.

FIG. 2 illustrates an example of an end seal 15a wherein the core portion 20a is formed with a pair of cylindrical openings 24a that are of essentially equal diameter. FIG. 3 illustrates an end seal 15b where the core portion 20b has openings 24b, 24b' of different diameters positioned about the outer peripheral surface 30b. FIG. 4 illustrates an end seal wherein the core portion 20c is equipped with a plurality of openings 24c, 24c' which are not symmetrical. Still other end seals may be used in the end seal assemblies of the present invention that employ core portions that have a noncircular cross-sectional shape. For example, in some cases it may be advantageous if the core portion has a cross-sectional shape that is essentially oblong or essentially polygonal.

As previously noted, the end seals used in the end seal assemblies of the present invention preferably have a core-and-tail construction. The tail portion of such an end seal can have a variety of configurations. Some novel tail configurations, which are especially useful in the practice of the present invention, are presented herein. However, while the configurations of these tails can vary, it is generally preferred that the tail portion have a length sufficient to wrap about the outer peripheral surface of the core portion at least once. In other words, the tail portion preferably has a length which is greater than the circumference of the outer periphery of the core portion.

Figure 5:
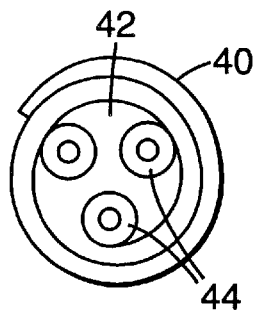
FIG. 5 is an end view of the end seal of FIG. 1 with the tail portion wrapped about the core portion and three cables.

FIG. 5 illustrates a core-and-tail type end seal in which the tail portion 40 has been wrapped about the core portion 42. In this particular example, the tail portion is sufficiently long that it makes more than one wrap about the core portion, and three cables 44 are disposed in the cylindrical openings.

Figure 6A:
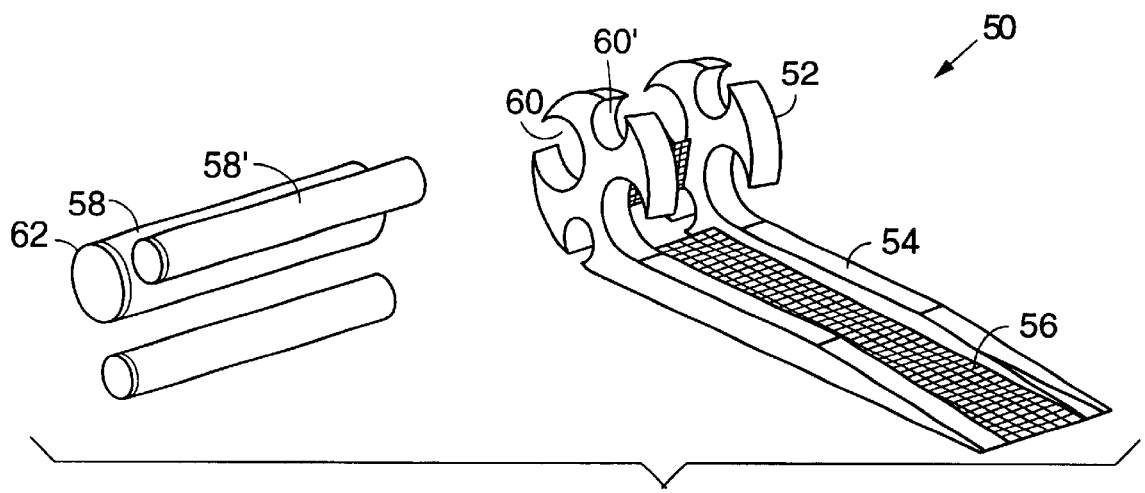
FIGS. 6a and 6b are perspective views of a fifth end seal that may be employed in the present invention, which is illustrated with a cable and two plugs disposed in the cylindrical openings of the core.
Figure 6B:
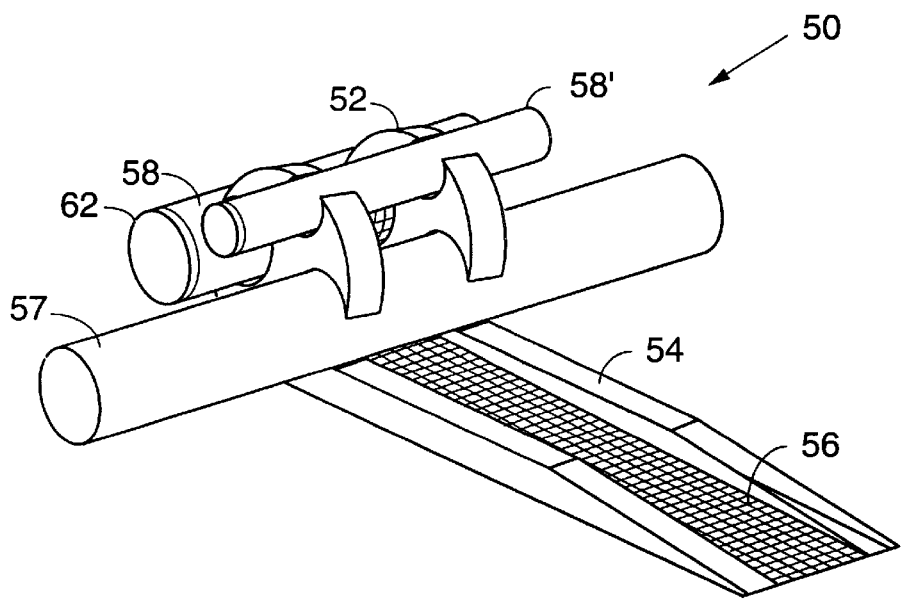

FIGS. 6a and 6b show perspective views of yet another end seal construction that is useful in the end seal assemblies of the present invention. In this embodiment, the end seal 50 has a core portion 52 with a tail portion 54 extending tangentially therefrom. The inner surface of the tail portion is equipped with a plastic mesh 56. The mesh is particularly useful when an open cell foam sealant is used, because it allows for better adherence of the foam to the tail portion.

The end seal of FIGS. 6a and 6b is also depicted with a cable 57 and two plugs 58, 58' disposed in the openings 60, 60' of the end seal. The plugs are used to seal off those openings that are not being used at present to contain a cable. Typically, one end of the plug terminates in a cap 62 that can be removed to allow access to the interior of the plug, and the other end of the cap (which is disposed within the splice housing) remains open. When an additional cable opening is required, the cap is removed, the additional cable is inserted into the new opening, and the opening is resealed. The plug is advantageous in that it allows an additional cable (or cables) to be introduced into the splice without disrupting the seal around existing wires.

Various types of plugs and caps are useful in the present invention. Preferably, the cap is merely a trimmable portion of the plug which can be removed, as by cutting, when an additional opening is required. Such a plug is depicted in commonly assigned U.S. design patent application Ser. No. 29/099,697, entitled "Cable Sealing Plug", which is filed of even date herewith and is incorporated herein by reference. However, in other embodiments, the cap is engaged in a threaded opening, and can be removed by twisting. In still other embodiments, the cap is equipped with a resilient washer or o-ring, and can be removed by pulling with sufficient force.

Figure 7:
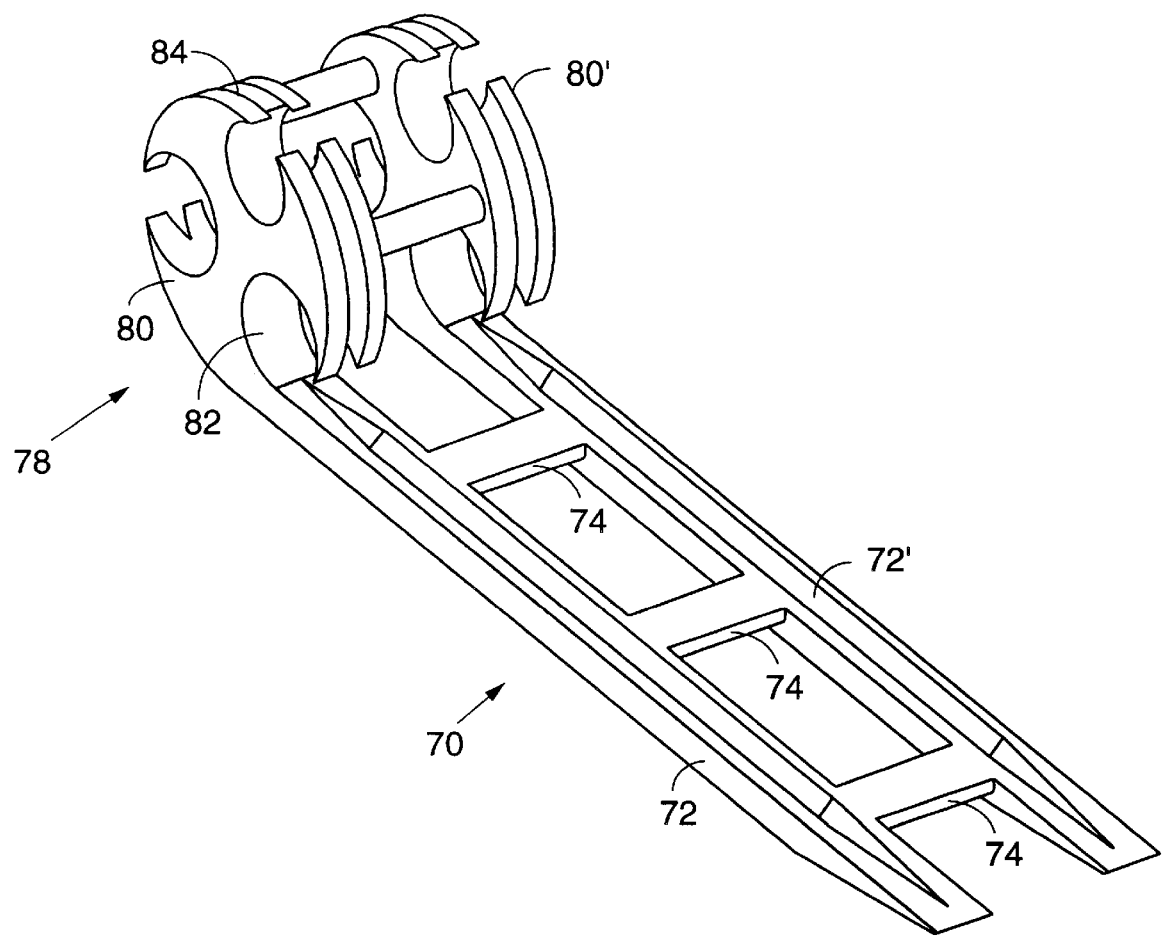
FIG. 7 is a perspective view of a sixth end seal that may be employed in the present invention.

FIG. 7 shows another example of an end seal that may be employed in the present invention. In this example, the tail portion 70 is formed by two longitudinal rails 72 and 72' which are connected together by periodically spaced transverse elements 74 so that the tail portion has a configuration resembling a ladder. In this embodiment, the core portion 78 is not a solid cylindrical unit as in some of the previously mentioned examples, but is formed from two spaced cylindrical disks 80 and 80' that are interconnected by two or more of the transverse elements. The disks each extend in a plane containing one of the longitudinal rails. Each longitudinal rail extends from one of the cylindrical openings 82 and 82' in its corresponding disk. Each disk may contain a circumferential groove 84 in its outer peripheral surface (this groove can also be incorporated into the embodiment shown in FIGS. 6a and 6b). As the tail portion is wrapped around the core portion, the longitudinal rails fit into the grooves, facilitating the process of wrapping the tail portion around the core portion. The coupling of the rails and grooves also forms an initial seal which acts to contain the sealant or adhesive while it is curing, and also helps prevent telescoping. Telescoping is further prevented by the fact that the sealant or adhesive which is injected into the end seal penetrates the spaces between the transverse elements (as it also penetrates the mesh in the embodiment depicted in FIGS. 6a and 6b) to form a solid, integral unit.

Figure 8:
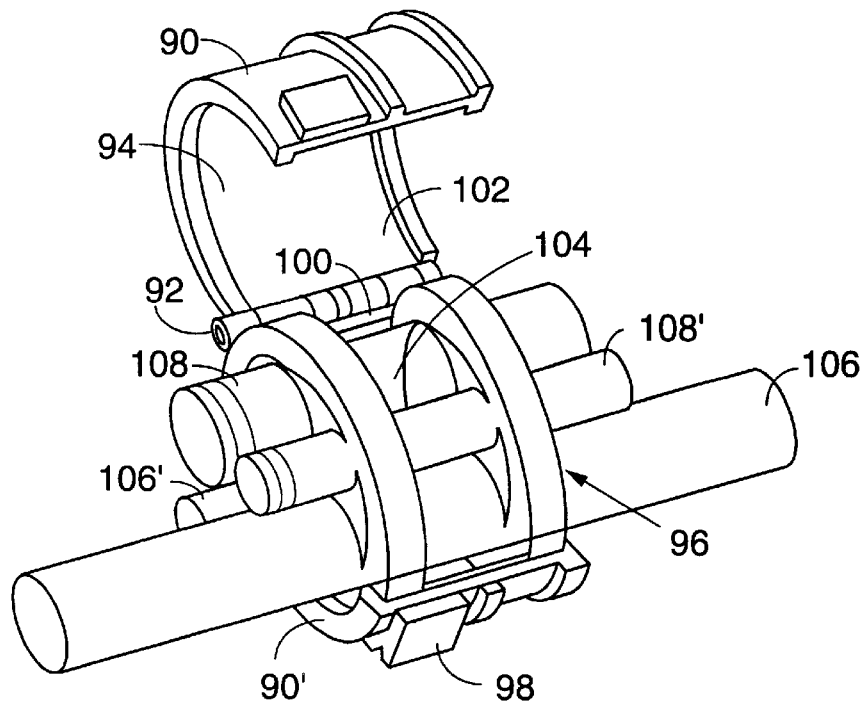
FIG. 8 is a perspective view of an end seal assembly which includes an end seal and a collar and which is constructed in accordance with the present invention.

FIG. 8 illustrates a further embodiment of the end seal assemblies of the present invention. In this embodiment, a rigid collar is positioned around the outer circumference of the wrapped end seal. The collar is preferably manufactured from an appropriately rigid material such as polypropylene. As shown in FIG. 8, the collar is formed from two semi-circular collar portions 90 and 90' that pivot about a hinge 92. The collar portions are dimensioned so that their inner surfaces 94 contact and enclose the outer circumference of a core-and-tail type end seal 96 which is wrapped and placed in the collar. The collar includes a latch 98 or other mechanism for securing together the two collar portions. As shown in the embodiment of the invention of FIG. 8, the latch is located about 180° from the hinge. Of course, if the collar portions are not symmetrical with respect to one another, then the latch may be located at the point where the two collar portions meet that is remote from the hinge. One or more gaskets 100, which may be formed from a mastic material, are located between the inner surfaces of the collar portions and the wrapped end seal so as to form a seal therebetween. The gaskets are situated in a groove 102 located in the inner surface of one or both collar portions.

As seen in FIG. 8, an enclosed cavity 104 is defined by the inner walls of the collar portions, end seal, cables 106 and 106', and plugs 108 and 108'. Since the cavity may conduct water and other vapors through the end seal assembly and into the splice case, the cavity is sealed with an expandable foam or other composition that advantageously resists passage of gas and vapors and provides an airtight seal. In addition to providing an air tight seal, the sealant composition also provides strain relief by bonding the cables, plugs (if any), end seal surfaces, and collar portions into an integral mass.

Figure 9:
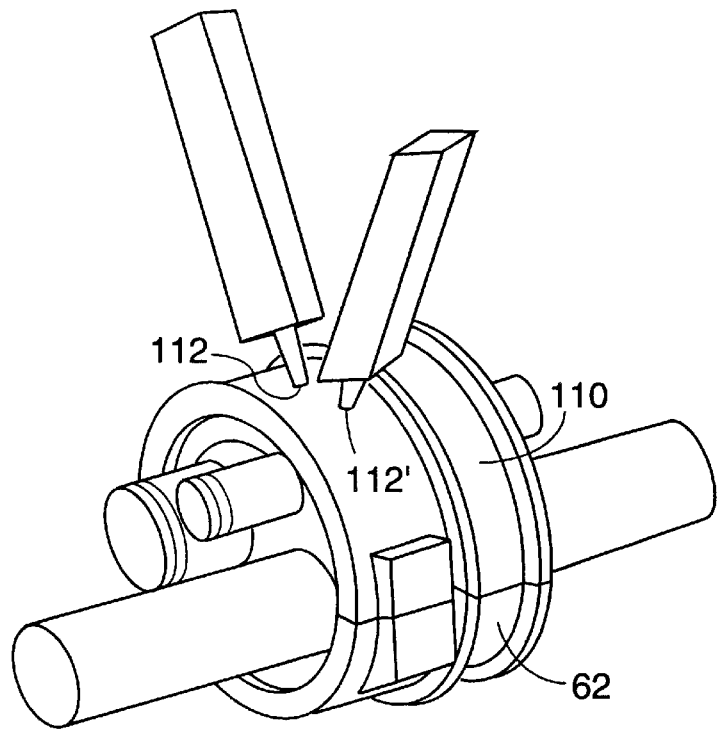
FIG. 9 is a perspective view of the end seal assembly of FIG. 8, in which the collar is secured around the end seal.

FIG. 9 shows a collar of the type depicted in FIG. 8 secured around the end seal. One important advantage of the collar is that it provides an outer sealing surface 110 that fits directly into the end of the splice case. Since the collar is rigid, the configuration of this sealing surface may be used as a standard that easily fits into a series of uniformly dimensioned splice cases, regardless of the precise dimensions of the end seal itself.

To allow injection of the sealant composition into the cavity, one of the collar portions is equipped with a first injection orifice 112. The sealant may be any of those known to the art, but is preferably of the type that is prepared from a two-part liquid curable composition. The parts are mixed prior to use and the composition is injected into the cavity through the first orifice in an amount at least sufficient to fill the cavity after expanding and curing. A second orifice 112' is employed to conduct out of the cavity any excess material that is present after the composition expands. One example of a suitable sealant is a substantially closed cell isocyanurate foam of the type disclosed in commonly assigned U.S. Pat. No. 4,640,978 (Kilbane et al.).

Figure 10:
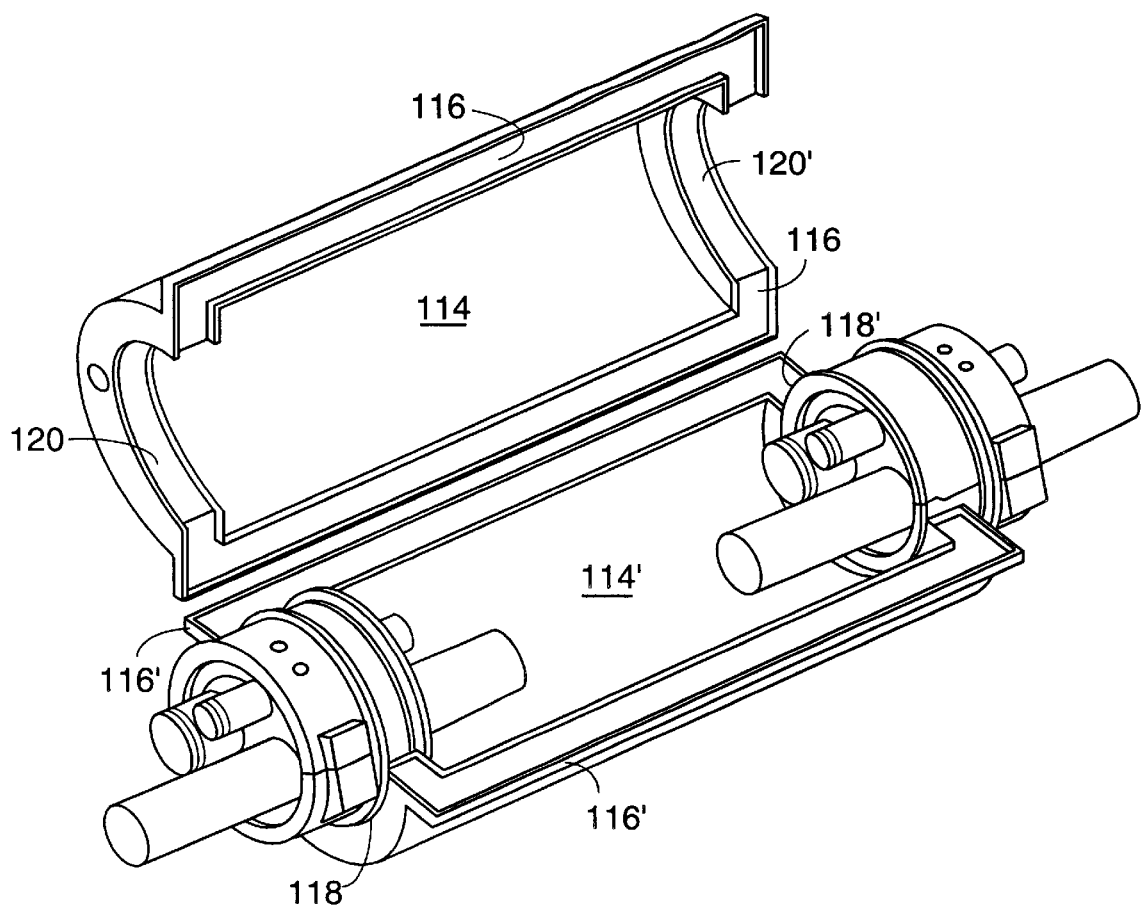
FIG. 10 is a perspective view of a cable splice enclosure that employs the end seal assemblies of FIGS. 8 and 9.

FIG. 10 shows a cable splice enclosure in which the end seal assemblies of the present invention may be employed. The enclosure comprises two semi-cylindrical half shells 114 and 114' that are joined together at flanges 116, 116' by a suitable fastener. When the shells are joined together, they define opposing circular openings 118, 118', each of which receives an end seal assembly. The circular openings each have circumferential surfaces 120, 120' that are extensions of their respective flanges. The circumferential surfaces contact the sealing surface of the end seal assemblies. The flanges, including the peripheral surfaces, support an elastomeric gasket (not shown) which helps to form a seal between the flanges of the two half shells themselves and between the half shells and the respective sealing surfaces of the end seal assemblies.

Because the end seal assembly of the present invention is a sealed integral unit, it is easily installed and removed from the splice enclosure without disturbing the cables or the end seals themselves. Additionally, the sealing surface provides a standard configuration that fits into a correspondingly configured splice case regardless of the precise dimensions of the end seal itself.

The end seals of the present invention can be made out of a variety of materials. One preferred class of materials are gels having elongations at break of at least 100%, more preferably at least 200%, shore 00 values from about 10 to about 50, and a ¼ cone penetration value of between about 10 to about 60. Useful gels include those comprising polyurethanes and polyesters. Preferred gels comprise polyurethanes, polyureas and mixtures thereof, which are derived from the reaction of polyisocyanates with liquid or quasi-liquid polyols or polyamines.

Useful organic isocyanate components include any suitable isocyanate having the required functionality, e.g., diisocyanates; the term isocyanate also includes isocyanate-terminated prepolymers. Polyisocyanates may be linear or branched, aliphatic, cycloaliphatic, araliphatic, heterocyclic or aromatic. Examples of such include dimer acid diisocyanate (DDI), isophorone diisocyanate (IPDI, 1-isocyanato-3,3,5-trimethyl-5-isocyanatomethylcyclohexane), 4,4'-diplienylmethane diisocyanate (MDI), 4,4'-methylenebis(cyclohexyl diisocyanate)($H_{12}$ MDI) and mixtures thereof.

The isocyanate should be present in sufficient amount to provide an isocyanate index of below about 150, preferably below about 100. Equivalents for each component can be calculated by dividing the actual weight in parts of each component by the equivalent weight. The equivalent weight herein is calculated on the basis of the number of active hydrogen groups, rather than the number of active hydrogen containing atoms. The Zerewitnoff test used to determine active hydrogen is described in Journal of the American Chemical Society, Vol. 49, page 3181 (1927).

Polyols useful in the invention are liquid or quasi-liquid polyols with di- or trifunctional polyols performing well. Suitable polyols may be selected from polyether polyols, based on ethylene oxide, propylene oxide, butylene oxide, tetrahydrofuran, epichlorohydrin or mixtures thereof, ricinoleic acid derivatives, e.g., castor oil, polyester polyols, polyamide or polyesteramide polyols, tertiary amine containing polyols, e.g., ethoxylated amides, propoxylated amides or amines, polyalkadiene polyols derived from butadiene polymers or copolymers, and hydrogenated derivatives thereof, polyacetals, polycarbonates containing hydroxyl groups, polyhydroxyl (meth)acrylic resins, polythioether polyols and the like. Also useful are polyhydroxyl compounds containing finely divided organic polymers in a dispersed or dissolved form, e.g., a dispersion polymer polyol, a grafted copolymer polyol, a solution polymer polyol, or blends thereof. The polymer polyols may be polyols containing high molecular weight polyadducts such as polyureas or polyhydrazodicarbonamides or polyurethane-ureas known as PIPA or PHD polyols in the art or grafted copolymer polyols which are polyols modified by vinyl polymerization.

Suitable polymeric amines contain more than one primary or secondary amino group capable of reacting with isocyanate groups. Examples include polyoxyalkylene polyamines derived from the amination of polyether polyols with the majority of the hydroxyl groups replaced by amine groups, polyamidoamines, or polyamines derived from dimerized fatty acids, amine terminated polybutadienes, amine terminated polytetrahydrofuran, amine terminated polybutadiene-acrylonitrile copolymers, amine terminated polyethers, polyamines containing urea moieties, cyanoethylated amine terminated polyoxypropylene ethers, or mixtures thereof.

Low molecular weight chain-extending or cross-linking agents (molecular weights from about 50 to about 400) containing at least two isocyanate-reactive hydrogen atoms may also be used in accordance with the present invention. Useful examples include alkanolamines, primary or secondary, aliphatic, cycloaliphatic, aromatic, araliphatic or heterocyclic amines, low equivalent weight amine-initiated polyether polyols, ricinoleic derivatives, hydroxyl containing organophosphates, and the like.

The gel compositions used in the present invention may also contain an extender or plasticizer. Useful hydrocarbon extenders include such groups as polyalphaolefins, cyclic polyolefins, petroleum oils, vegetable oils, castor oil, naphthenic oils, paraffinic oils, synthetic oils, hydrogenated terphenyls, pine oil or coal tar or other terpene derivatives. A variety of esters may also be used including those of adipic, phthalic, trimellitic as well as cyclopentadiene copolymers with fatty acid esters, polymeric polyesters, rosin esters, acrylate esters, epoxidized fatty materials, ricinoleic derivatives, phosphates or halogenated phosphate esters, and the like.

Conventional catalysts used in the preparation of polyurethanes may be employed herein. Representative catalysts include the tertiary amine catalysts, including 1,8-diazabicyclo[5.4,0] undec-7-ene (DBU), and salts thereof, triethylene diamine and the like, and organometallic catalysts of tin, zinc, bismuth, lead, iron and the like. Currently preferred is BiCat 8, a bismuth/zinc neodecanoate mixture.

Gel compositions used in the present invention may also contain hollow microspheres. The microspheres may be glass, such as those commercially available from Minnesota Mining and Manufacturing Company (3M) under the trade name SCOTCHLITE™; polymeric, such as those commercially available from Nobel Industries under the trade name EXPANCEL™ 551DE; microballoons, such as those commercially available from Union Carbide Corporation under the trade name UCAR™ or from Pierce & Stevens Corporation under the trade name DUALITE™ M6001AE; or ceramic, such as those commercially available from Zeelan Industries under the trade name Zeeosphere™ X-40. Such microspheres may also be treated with a coupling or wetting agent such as a silane, e.g., 3-glycidoxypropyl trimethoxy silane, to enable the resin to effectively wet the microspheres.

Additional fillers may also be used in the gel compositions used in the present invention. Such fillers may include, for example, glass fibers, graphite fibers, fibrous materials, carbon black, mica, silicates, carbonates, fumed silica, and the like.

Other materials useful in the end seal assemblies of the present invention include elastomers, mastics and closed-cell foams. Useful elastomers may be any thermoplastic elastomer which is solid at room temperature, has an elongation of from about 150% to about 500%, and a shore A hardness of about 10 to about 75. Suitable materials include natural rubber, butyl rubber, EPDM rubber, polyisoprene, polybutadiene, polyester, polyurethane, thermoplastic olefins, chloroprene rubber, styrene-butadiene copolymers (random or block), styrene-isoprene copolymers (random or block), acrylonitrile-butadiene copolymers, mixtures thereof and copolymers thereof. The block copolymers may be linear, radial or star configurations and may be diblock (AB) or triblock (ABA) copolymers or mixtures thereof Commercially available elastomers useful in the present invention include those obtainable under the KRATON™ trade names such as KRATON™ 1107, KRATON™ 1650, KRATON™ 1657, and those available under the tradename CARIFLEX™, both from Shell Chemical Company. Also useful are those available from Firestone under the trade name STEREON™, those available under the trade name HYCAR™, and the like. Such elastomers may be plasticized to form mastics which are also useful, either combined with other materials or foamed. Examples of such plasticized mastics include those sold under the trade name INSOLITE™, commercially available from Uniroyal Corporation.

Any of the compositions useful in end seals of the invention may also include adjuvants such as solvents, fillers, pigments, antioxidants, flow agents, fungicides, surfactants, carbon black, flame retardants, and the like.

The above description of the present invention is illustrative and is not intended to be limiting. Therefore, the scope of the present invention should be construed solely by reference to the appended claims.

What is claimed is:

1. An end seal assembly, adapted to seal the space between at least one cable and a closure and to thereby restrict fluid transfer through the seal assembly, comprising:
   an end seal having a body formed from an elastic, flexible material, said body including
   (a) a core portion having an outer peripheral surface, spaced ends, and a wall forming at least one cylindrical opening through said core portion, said at least one cylindrical opening extending between said spaced ends, said wall having two edges communicating with the outer peripheral surface of the core portion to define between the two edges an entrance slot to the at least one cylindrical opening, and
   (b) an extended tail portion integral with and extending from the outer peripheral surface of the core portion, said tail portion having a surface tangential to the wall forming said at least one opening, said tail portion having sufficient length to wrap about said outer peripheral surface of the core portion to form a wrapped end seal such that said tail portion covers the entrance slot of the at least one opening and a cable to be placed therein;
   a rigid collar having first and second collar portions that are pivotably interconnected, said first and second portions having inner surfaces that conform to and enclose the wrapped end seal to form an inner cavity between the wrapped end seal and the first and second portions of the collar, said collar also having an outer surface adapted to sealingly abut an end of the closure; and
   a sealant composition filling the inner cavity to bond together the wrapped end seal, the cable to be placed in said at least one opening, and the rigid collar.

2. An end seal assembly according to claim 1 wherein a free end of the tail portion remote from the core portion tapers to an end of reduced thickness.

3. An end seal assembly according to claim 1 further comprising a gasket located in a recess of the inner surfaces of the collar portions to form a seal with the wrapped end seal.

4. An end seal assembly according to claim 3 wherein said gasket is formed from a mastic material.

5. An end seal assembly according to claim 3 wherein said core portion has an oblong cross-sectional shape.

6. An end seal assembly according to claim 1 further comprising a first orifice disposed in one of said collar portions for conducting the sealant composition into the inner cavity.

7. An end seal assembly according to claim 6 further comprising a second orifice disposed in said one of said collar portions for conducting out of the inner cavity excess sealant composition.

8. An end seal assembly according to claim 1 wherein said sealant composition is an expandable foam composition.

9. An end seal assembly according to claim 8 wherein said expandable foam composition is a substantially closed cell isocyanurate foam.

10. An end seal assembly according to claim 1 further comprising a meshed material extending over an inner surface of the tail portion.

11. An end seal assembly according to claim 10 wherein said sealant composition is an open cell foam composition.

12. An end seal assembly according to claim 1 wherein said tail portion includes two longitudinal rails and at least one transverse element coupling said two longitudinal rails.

13. An end seal assembly according to claim 1 wherein said core portion includes first and second spaced disks and at least one transverse element coupling said first and second disks, said at least one cylindrical opening extending through said first and second disks.

14. An end seal assembly according to claim 13 wherein said tail portion includes two longitudinal rails respectively extending from the first and second spaced disks and at least one transverse element coupling said two longitudinal rails.

15. An end seal assembly according to claim 14 wherein the first and second spaced disks have outer circumferential surfaces and further comprising a groove located in each of said outer circumferential surfaces, each of said grooves being configured to receive one of the longitudinal rails as the tail portion is wrapped around the core portion.

16. An end seal assembly according to claim 1 wherein said at least one cylindrical opening comprises a plurality of cylindrical openings.

17. An end seal assembly according to claim 16 wherein at least two of the cylindrical openings differ in diameter.

18. An end seal assembly according to claim 16 wherein at least two of the cylindrical openings have different arcuate dimensions.

19. An end seal assembly according to claim 1 wherein the end seal is formed of a material having an inherent self-adhesive property such that there is created a high frictional coefficient between the tail portion and the core portion and between individual wraps of the tail portion about the core portion.

20. An end seal assembly according to claim 1 wherein the tail portion is tapered along its length such that the width of the tail portion at its free end is narrower than its end adjacent the core portion.

21. An end seal assembly according to claim 1 wherein said core portion has a circular cross-sectional shape.

22. An end seal assembly according to claim 1 wherein said body of elastic, flexible material is selected from the group consisting of gels, elastomers, mastics and foams.

23. An end seal assembly according to claim 22 wherein said body is a gel having a Shore 00 hardness of from about 10 to about 50, an elongation of greater than 100%, and a density of less than about 0.8 gm/cc.

24. An end seal assembly according to claim 22 wherein said gel comprises at least one diisocyanate and at least one isocyanate reactive material selected from the group consisting of polyols, polymer polyols, and polymeric amines, wherein said gel has an isocyanate index of less than 100.

25. An end seal assembly according to claim 24 wherein said gel comprises a polyureaurethane.

26. An end seal assembly according to claim 24 wherein said gel comprises from about 10 to about 30% of a hydroxyl terminated polybutadiene, from about 2 to about 20 of a difunctional amine terminated butadiene acrylonitrile polymer, from about 3 to about 8% $C_{36}$ dimer acid diisocyanate, from about 25 to about 50% vegetable oil, from about 15 to about 40% polyalphaolefin, from about 0.5 to about 5% silica, from about 0.5 to about 5% antioxidant, from about 0.1 to about 5% zinc catalyst, and from about from about 5 to about 25% glass microbubbles.

27. A method for sealing the space between at least one cable and a closure to restrict fluid transfer therethrough, said method comprising the steps of:

inserting a cable into an opening formed in a core portion of a body formed from an elastic, flexible material;

wrapping around an outer peripheral surface of the core portion an extended tail portion that is integrally formed with and extends from the outer peripheral surface of the core portion, thereby forming a wrapped end seal;

placing a rigid collar having an outer surface adapted to sealingly abut an end of the closure around the wrapped end seal; and filling an inner cavity formed between the rigid collar and the wrapped end seal with an expandable sealant composition via at least one orifice provided in the rigid collar to thereby form a sealed end unit assembly.

28. An end seal, comprising:

a core portion, equipped with an aperture adapted to receive a cable to be inserted therethrough; and a flexible tail portion, extending from said core portion, said tail portion being of sufficient length and flexibility to be wrapped around said core portion so as to cover said aperture;

wherein said tail portion comprises a plurality of longitudinal elements which are connected along at least one portion of their length by a mesh.

29. The end seal of claim 28, wherein said aperture is a longitudinal slot.

30. The end seal of claim 28, wherein said core portion comprises a resilient material.

31. The end seal of claim 28, wherein said mesh is a plastic mesh.

32. The end seal of claim 28, having a foam sealant.

33. The end seal of claim 32, wherein said foam sealant is an open cell foam.

34. The end seal of claim 28, wherein said core portion is equipped with a plurality of said apertures, wherein a first of said plurality of apertures has a cable inserted therein, and wherein a second of said plurality of apertures has a cap inserted therein.

35. The end seal of claim 28, wherein said plurality of longitudinal elements is a pair of flexible rails.

36. A method for sealing a space between a cable and a closure, comprising the steps of:

providing a closure equipped with an opening for receiving a cable;

providing an end seal comprising a core portion with a tail portion attached thereto, said tail portion extending from an outer peripheral surface of said core portion, said core portion having at least one slot therein which is adapted to receive the cable;

inserting the cable into the at least one slot;

wrapping the tail portion around the outer peripheral surface of the core portion such that the tail portion extends over the at least one slot, thereby forming a wrapped end seal;

placing a rigid collar around the wrapped end seal such that a cavity is formed between the end seal and the collar, said collar having an outer surface adapted to sealingly abut the surfaces of the opening in the closure; and filling the cavity with an expandable sealant composition.

37. The method of claim 36, wherein the tail portion has a tapered end.

38. The method of claim 36, wherein the core portion comprises first and second spaced disks.

39. The method of claim 38, wherein the tail portion comprises at least one longitudinal rail, wherein at least one of the first and second disks has an outer circumferential surface equipped with a groove, and wherein said groove is adapted to receive said rail when the tail portion is wrapped around the core portion.

40. The method of claim 36, wherein the at least one slot comprises has a plurality of slots, and wherein at least two of the plurality of slots have different diameters.

41. The method of claim 36, wherein the cable is in contact with the tail portion in the wrapped end seal.

42. The method of claim 36, wherein the cavity is filled via at least one orifice provided in the rigid collar.

* * * * *